UNITED STATES PATENT OFFICE.

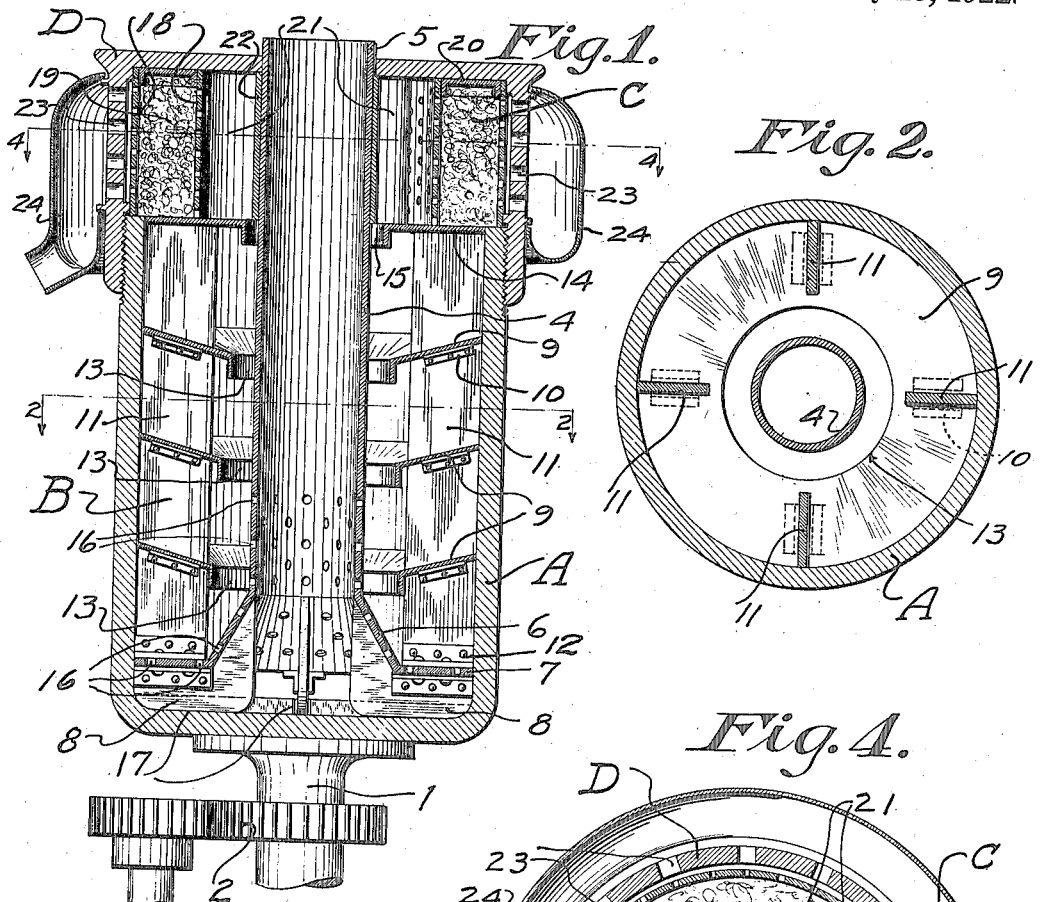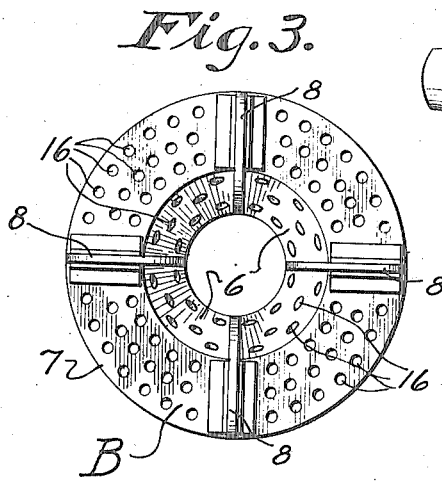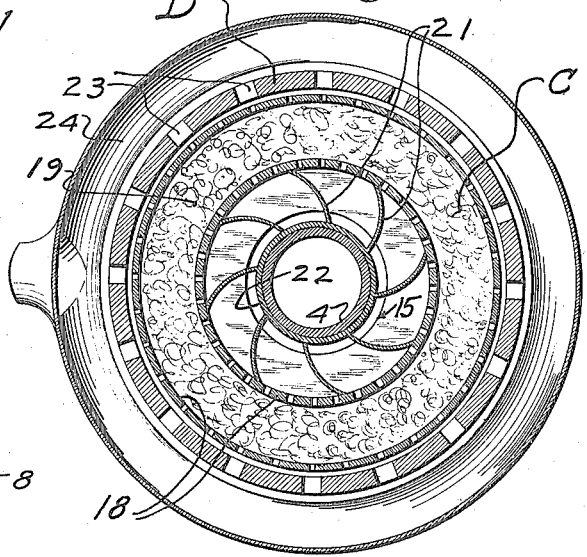

CHARLES H. HOLMGREN, OF BLOOMFIELD, NEW JERSEY.

CENTRIFUGAL SEPARATOR.

1,417,064.  Specification of Letters Patent.  Patented May 23, 1922.

Application filed February 25, 1921. Serial No. 447,710.

*To all whom it may concern:*

Be it known that I, CHARLES H. HOLMGREN, a citizen of the United States, and a resident of Bloomfield, in the county of Essex and State of New Jersey, have invented new and useful Improvements in Centrifugal Separators, of which the following is a specification.

This invention relates to centrifugal separators and filters for separating solid matter from liquids, or separating liquids of different specific gravities, one object of the invention being to provide a machine of this character embodying novel features whereby a more thorough and complete separation of solid and other foreign matter from a liquid or separation of the heavy liquid from the lighter liquid is effected in an efficient manner.

Further objects of the invention are to provide a centrifugal separator in which the solid matter or heavier liquid after having once been thrown outwardly to walls of the separator chamber is held there and prevented from again intermingling with the clarified or lighter liquid; to provide means for separating out the heavier matter by steps in separate compartments and holding the various grades of heavy matter in their respective compartments; to provide a centrifugal separator having an axial inlet pipe through which the liquid to be clarified is injected into the separator chamber at its inner end, and a plurality of spacedly superposed baffles having axial openings around said inlet pipe which gradually decrease in diameter toward the outer end of the separator chamber to produce a gradually restricted outlet for the clarified or light liquid, whereby the clear or lighter liquid is forced inwardly away from the solid or heavy matter and prevented from intermingling therewith and the finer solid matter or matter of only slightly greater specific gravity than the lightest liquid which is less susceptible to the centrifugal action and thus remains nearer the center of the chamber, is separated out by the successively overhanging baffles; to provide improved means for centrifugally forcing the liquid as it passes the most restricted portion of the outlet through a filter medium; to provide a filter having an axial inlet and a peripheral outlet with a filter medium therebetween, and a plurality of revoluble radially disposed vanes or blades for centrifugally impelling the liquid from said inlet through said filter medium to said outlet, and to obtain other results and advantages as may be brought out by the following description.

Referring to the accompanying drawings, in which like numerals of reference indicate the same parts throughout the several views, Figure 1 is a vertical longitudinal sectional view through a centrifugal separator constructed in accordance with my invention;

Figure 2 is a horizontal sectional view taken on the line 2—2 of Fig. 1;

Figure 3 is a bottom plan view of the separator element. and

Figure 4 is a horizontal sectional view through the filter element taken on the line 4—4 of Fig. 1.

In the embodiment of my invention shown on the drawings, A designates a substantially cylindrical vertical casing which is adapted to be rapidly revolved by any suitable means such as the shaft 1 rigidly connected to the bottom of the casing axially thereof and driven through suitable gearing 2.

A separator element B is adapted to be removably placed in the casing A, and comprises a liquid inlet pipe 4 which is adapted to be arranged axially of the casing A and has its outer end 5 projecting exteriorly of the casing to be connected to a supply of liquid to be clarified. The inner end of the pipe 4 is flared outwardly at 6 and formed with an annular flange 7, the said inner end of the pipe being supported upon and spaced from the inner or bottom end of the casing A by spaced radially disposed supports 8. A plurality of spaced and superposed baffle plates 9 are arranged above the flange 7, the said baffle plates being of a diameter slightly less than the interior diameter of the casing A and being supported in any suitable manner, as by welding or by the angle brackets 10 to a plurality of spaced vertical strips 11, the inner ends of which are rigidly connected to the annular flange 7 by any suitable means, such as the angle strips 12 riveted to the strips 11 and the flange 7 as shown in Figures 1 and 2. The baffle plates 9 are arranged circumferentially of the pipe 4 and provided with axial openings 13 spaced from the walls of the said pipe. The respective openings 13 gradually decrease in diameter from the bottom of the casing A toward the top thereof to form a gradually restricted passage from the lower end of the casing toward the upper end thereof as clearly shown in Figure 1. The separator element B is substantially of the same length as the casing A and is provided at its upper end with an annular cover 14 having an axial opening 15 surrounding the pipe 4 and of less diameter than the opening 13 of the next lower baffle plate 9.

The inner end of the pipe 4 and the flange 7 are provided with a plurality of perforations 16 to allow the passage of the liquid to be clarified from the pipe 5 into the lower end of the casing A. The separator element B is intended to rotate with the casing A, and one means of providing a positive connection between the separator element and the casing A so that the separator element will rotate with the casing is shown in Figure 1 of the drawings and comprises grooves 17 in the bottom of the casing to receive the supports 8. As the casing A is revolved the liquid entering the casing through the perforations 16 in the pipe 5 is thrown by centrifugal force outwardly toward the walls of the casing and the solid or heaviest matter is collected between the annular flange 7 and the bottom of the casing and between said flange and the lowermost baffle plate 9. The lighter matter and liquid is thus forced toward the axis of the casing and passes upwardly through the opening 13 in the lowermost baffle plate where more of the solid or heavy matter is deposited between the lowermost baffle plate and the next baffle plate above the same. This action continues until the liquid passes through the opening 15 in the cover 14 of the separator element. The openings 13 in the baffle plates being gradually reduced in diameter toward the outlet or upper end of the casing A, the solid matter is retained between the respective baffle plates and after having once been separated out from the liquid is prevented from again intermingling therewith, the clarified liquid being gradually forced nearer and nearer the axis of the casing through the restricted openings 13. Thus the matter of lesser specific gravity which is less susceptible to the centrifugal action and remains nearer the axis of the casing is separated out near the top of the casing by the successively overhanging baffle plates and the cover 14 which has a larger restricing area due to its smaller opening 15. The upright strips 11 of the separator element also form pockets between themselves and adjacent baffle plates 9 so as to effectively retain the heavy and solid matter and prevent the same from intermingling with the clarified liquid after having been once separated therefrom.

After the liquid has been partially clarified by the separator element B it passes from the opening 15 in the cover 14 of the separator element through a filter element C. This filter element comprises a pair of spaced annular perforated plates or screens 18 which are adapted to rest upon the cover 14 of the separator element and receive between them a filter medium 19, such for instance as felt, the screens being maintained in proper spaced relation by an annular cover plate 20 rigidly secured to the upper end of each of the screens. Arranged between the innermost annular screen 18 and the pipe 4 are a plurality of vertically disposed vanes 21 which have their inner ends connected to a sleeve 22 surrounding the pipe 5, and the outer ends of the vanes may be connected to the innermost screen 18. The filter element C is held in position by means of a removable cover D having a threaded connection with the casing A. The vanes 21 may be either curved as shown or straight, and are inclined so as to impel the liquid entering the filter element through the opening 15 of the separator element B outwardly through the screens 18 and filter medium 19 by centrifugal action as the casing A rotates. After the liquid passes through the filter medium 19 it flows outwardly through openings 23 in the flange of the cover D and thence into a suitable receptacle or collector 24.

It will thus be seen that with my invention the liquid is first fed into the inner end of the separator casing and the different grades of solid matter are successively separated by centrifugal action and the superposed baffles 9, the clear liquid being gradually forced toward the axis of the casing and then forced by centrifugal action outwardly through the filter medium, whereby the liquid is clarified to the maximum degree. The gradually restricted outlet for the clear liquid formed by the openings 13 in the baffle effectively prevents the heavy matter after having once been separated from mingling with the clear liquid, and separates out the heavy matter by steps from the inner end of the casing to the outer end thereof.

While I have shown and described one possible embodiment of my invention, it will be understood that this is for the purpose of illustrating the principles thereof only, and that many modifications and changes can be made in the detail construction of the invention without departing from the spirit or scope thereof. Therefore, I do not desire to be understood as limiting myself except as required by the following claims when construed in the light of the prior art.

Having thus described the invention, what I claim is:

1. A centrifugal separator including a revoluble casing provided with a separating chamber therein having an inlet for the liquid to be clarified at one end of said chamber and an outlet at the other end, and a plurality of spaced baffle plates arranged between said inlet and said outlet, snugly fitting the interior walls of said chamber and provided with openings axially arranged with respect to said casing and gradually decreasing in size from said inlet to said outlet.

2. A centrifugal separator including a substantially cylindrical revoluble casing provided with a separating chamber therein having an inlet for the liquid to be clarified at one end thereof and an outlet at the other end, and a plurality of baffle plates of a diameter substantially equal to the interior diameter of said casing spacedly arranged longitudinally of said casing, each of said baffle plates being formed with an axial opening and the said openings gradually decreasing in diameter from the said inlet to said outlet.

3. A centrifugal separator including a revoluble casing, an inlet pipe for the liquid to be clarified arranged axially of said casing and opening through one end thereof for connection to a liquid supply, said pipe opening into the opposite end of said casing, and a plurality of baffle plates snugly engaging the interior walls of said casing spaced longitudinally of said pipe and surrounding the same, each of said baffle plates having an axial opening around said pipe, said openings decreasing in size from the inner end of said pipe toward the outer end thereof.

4. A centrifugal separator including a revoluble casing having an inlet for the liquid to be clarified and an outlet, a separator element for clarifying the liquid centrifugally comprising a plurality of baffles arranged between said inlet and said outlet and having openings axially arranged with respect to said casing to provide an outlet of the liquid from said element, a filter element having an axial inlet opening to receive the liquid from the outlet of said separator element, and a plurality of radially disposed vanes adjacent said inlet of the filter element for impelling the liquid through said filter element to said outlet of the casing.

5. A centrifugal separator including a revoluble casing having an inlet for the liquid to be clarified and an outlet, a separator element for centrifugally clarifying the liquid and having an axial outlet, a filter element movable with said casing having an axial inlet communicating with said outlet of the separator element and an outlet at the periphery thereof, said filter element being provided with an annular filter medium between said inlet and outlet, and means for centrifugally impelling the liquid from said inlet through the said filter medium to said outlet.

6. A centrifugal filter including a casing having an axial inlet for the liquid to be filtered and a peripheral outlet, an annular filter medium interposed between said inlet and said outlet, and a plurality of revoluble radially disposed vanes arranged in said inlet for impelling the liquid from said inlet through said filter medium to said outlet.

7. A centrifugal filter including a revoluble casing having an axial inlet for the liquid to be filtered and a peripheral outlet, an annular filter medium interposed between said inlet and said outlet, and a plurality of radially disposed vanes arranged in said inlet and movable with said casing for impelling the liquid from said inlet through the filter medium to said outlet.

CHARLES H. HOLMGREN.